(12) United States Patent
Arai et al.

(10) Patent No.: US 11,365,137 B2
(45) Date of Patent: Jun. 21, 2022

(54) ELECTRO OXIDATION MEMBRANE EVAPORATOR

(71) Applicant: Oceaneering International, Inc., Houston, TX (US)

(72) Inventors: Tatsuya Arai, League City, TX (US); John Fricker, Taylor Lake Village, TX (US)

(73) Assignee: Oceaneering International, Inc., Houston, TX (US)

( * ) Notice: Subject to any disclaimer, the term of this patent is extended or adjusted under 35 U.S.C. 154(b) by 139 days.

(21) Appl. No.: 16/870,347

(22) Filed: May 8, 2020

(65) Prior Publication Data

US 2020/0354240 A1    Nov. 12, 2020

Related U.S. Application Data

(60) Provisional application No. 62/845,062, filed on May 8, 2019.

(51) Int. Cl.
*C02F 1/46*    (2006.01)
*C02F 1/66*    (2006.01)
(Continued)

(52) U.S. Cl.
CPC .......... *C02F 1/4674* (2013.01); *B01D 53/047* (2013.01); *B01D 53/1456* (2013.01);
(Continued)

(58) Field of Classification Search
CPC ........ C02F 1/4674; C02F 1/001; C02F 1/448; C02F 1/46104; C02F 1/52; C02F 1/66; C02F 2201/001; C02F 2201/46135; C02F 2201/4614; C02F 2201/46145; C02F 2201/4618; C02F 2201/4619; C02F 2209/02; C02F 2209/03; C02F 2209/06; C02F 2209/38; C02F 2209/40; C02F 2301/046; C02F 2303/02; C02F 2303/04; C02F 2001/46142; C02F 2001/46147; C02F 2201/46115; C02F 1/4672; C02F 2103/005; C02F 1/008; C02F 1/72; C02F 1/727; B01D 53/047; B01D 53/1456;
(Continued)

(56) References Cited

U.S. PATENT DOCUMENTS

2004/0232007 A1\* 11/2004 Carson .................... A61L 11/00
                                                                      205/688
2005/0245784 A1\* 11/2005 Carson .................... A61L 2/025
                                                                      588/302

(Continued)

*Primary Examiner* — Joseph W Drodge
(74) *Attorney, Agent, or Firm* — Maze IP Law, P.C.

(57) ABSTRACT

Electro oxidation membrane evaporator 1 comprises sweep air handler 60; fluid tank 20 defining a fluid container; fluid contactor/separator 30; oxidation cell 40; and scrubber 80. Electro oxidation membrane evaporator 1 may allow higher percent water recovery from wastewater prior to delivering brine to a brine water recovery system and can allow $O_2$ from air such as cabin air to continuously diffuse into the wastewater as $O_2$ is consumed to generate oxidants, helping to eliminate the low oxidant environment at the end of the cycle that causes pH to remain high, and low pH prevents precipitates from forming for longer so more water can be evaporated from the wastewater.

22 Claims, 4 Drawing Sheets

(51) Int. Cl.
  C02F 1/52    (2006.01)
  B01D 53/04   (2006.01)
  B01D 53/18   (2006.01)
  B01D 53/14   (2006.01)
  C02F 1/44    (2006.01)
  B64G 1/60    (2006.01)
  C02F 1/467   (2006.01)
  C02F 1/461   (2006.01)
  C02F 1/00    (2006.01)
  B01D 53/047  (2006.01)
  B64D 13/00   (2006.01)

(52) U.S. Cl.
  CPC ............ B01D 53/18 (2013.01); B64D 13/00 (2013.01); C02F 1/001 (2013.01); C02F 1/448 (2013.01); C02F 1/46104 (2013.01); C02F 1/52 (2013.01); C02F 1/66 (2013.01); *B01D 2256/12* (2013.01); *B01D 2257/102* (2013.01); *B01D 2259/4575* (2013.01); *B64G 1/60* (2013.01); *C02F 2201/001* (2013.01); *C02F 2201/4614* (2013.01); *C02F 2201/4618* (2013.01); *C02F 2201/4619* (2013.01); *C02F 2201/46135* (2013.01); *C02F 2201/46145* (2013.01); *C02F 2209/02* (2013.01); *C02F 2209/03* (2013.01); *C02F 2209/06* (2013.01); *C02F 2209/38* (2013.01); *C02F 2209/40* (2013.01); *C02F 2301/046* (2013.01); *C02F 2303/02* (2013.01); *C02F 2303/04* (2013.01)

(58) Field of Classification Search
  CPC ................ B01D 53/18; B01D 2256/12; B01D 2257/102; B01D 2259/4575; B01D 2252/204; B01D 2253/102; B01D 2253/108; B01D 2253/116; B01D 2256/22; B01D 2257/2025; B01D 53/04; B01D 19/0031; B01D 19/0068; B01D 19/0084; B01D 36/00; B01D 36/001; B01D 53/34; B01D 53/40; B01D 53/603; B01D 53/76; B01D 2252/102; B01D 2252/108; B01D 2252/116; B64D 13/00; B64G 1/60

See application file for complete search history.

(56) References Cited

U.S. PATENT DOCUMENTS

| | | | |
|---|---|---|---|
| 2017/0107137 A1* | 4/2017 | Jung | C25B 1/29 |
| 2017/0320765 A1* | 11/2017 | Bigelow | C02F 9/00 |
| 2018/0179097 A1* | 6/2018 | Navarro | C02F 1/008 |
| 2018/0265993 A1* | 9/2018 | Kamire | B01D 53/1475 |
| 2019/0388832 A1* | 12/2019 | Rheaume | A62C 99/0018 |
| 2020/0002195 A1* | 1/2020 | Ricci | C02F 1/4672 |

* cited by examiner

ELECTRO OXIDATION MEMBRANE EVAPORATOR

RELATION TO OTHER APPLICATIONS

This application claims priority through U.S. Provisional Application 62/845,062 filed on May 8, 2019.

BACKGROUND

Recent advancement in terrestrial wastewater management involves use of an oxidation cell to reduce organics in wastewater circulation by generating oxidants from substances such as chloride and oxygen in wastewater itself. The technology is applicable to manned space missions in which water reclamation from urine is essential for sustainable long-duration missions. However, there are challenges in applying the technology to space missions: (A) it is known that urine with low concentration of chloride results in shortage of oxidants, thus failing to complete oxidation and provide drinking water; (B) the oxidation process involves gas generation. Under microgravity, it is difficult to handle gas bubbles (they do not simply go up to escape) which causes over-pressurization of wastewater loop; (C) the produced gas could be toxic and needs to be handled carefully, especially in an enclosed environment in space; and (D) changes in pH during the oxidation process can cause precipitation of minerals and cause damage to instruments in the wastewater loop.

FIGURES

Various figures are included herein which illustrate aspects of embodiments of the disclosed inventions.

DESCRIPTION OF EXEMPLARY EMBODIMENTS

Figure 1:
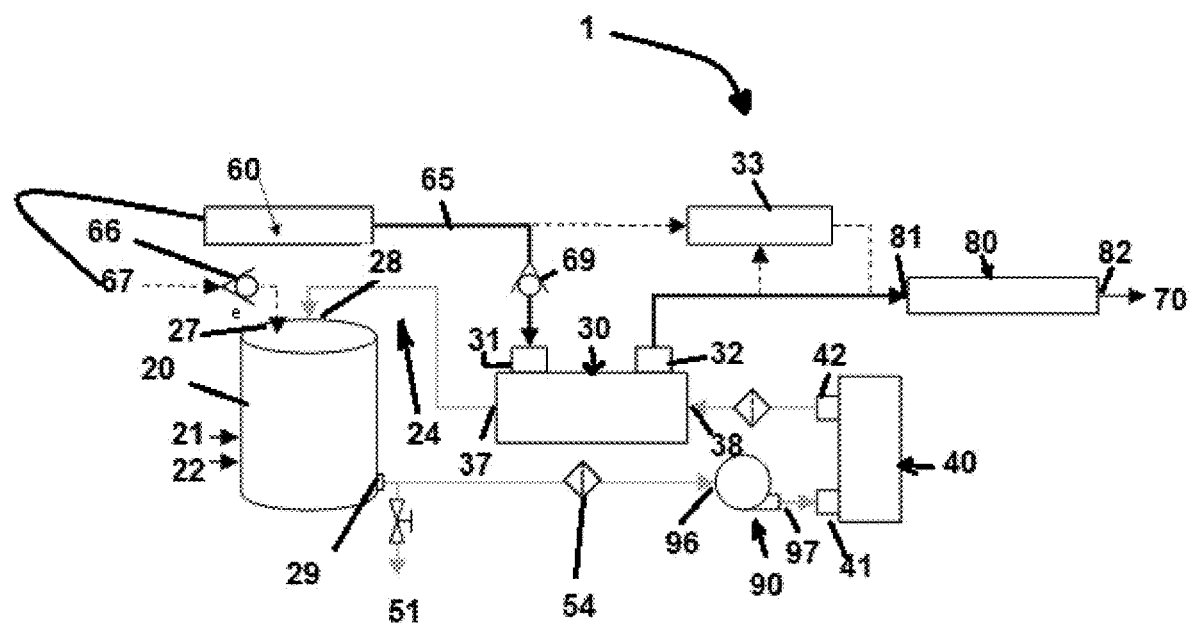
FIG. 1 is a schematic view of an embodiment of an exemplary electro oxidation membrane evaporator.

In a first embodiment, referring generally to FIG. 1, electro oxidation membrane evaporator 1 comprises sweep air handler 60; fluid tank 20 defining a fluid container; fluid contactor/separator 30; oxidation cell 40; and scrubber 80. In embodiments, electro oxidation membrane evaporator 1 is microgravity and partial gravity compatible.

As used herein, "wastewater" can comprise augmented urine, flush water, and pretreat. In embodiments, a fluid pathway between fluid tank fluid outlet 29, oxidation cell fluid inlet 41, oxidation fluid cell outlet 42, separator oxidation cell fluid inlet 38, first fluid contactor/separator fluid outlet 37, and separated fluid inlet 28 defines a wastewater fluid loop.

It is noted that in these various embodiments and methods described herein, water may be reclaimed from wastewater by continuous generation of oxidants, degassing by hydrophobic hollow membrane fibers (contactor), evaporating water, and active control of temperature. In brief, a large-surface membrane contactor such as fluid contactor/separator 30 not only de-bubbles gas out of the wastewater loop to prevent pressure buildup but also continuously dissolves oxygen from air that can be used for oxidant generation and evaporates water efficiently to be condensed somewhere else for drinking water. Acid gas scrubber 80 absorbs toxic gas from fluid contactor/separator 30 to supply clean humid air to cabin. The pH and temperature of the wastewater loop can be actively controlled to manage precipitation.

Fluid tank 20 typically comprises one or more waste fluid inlets 21; one or more intake fluid inlets 22; one or more sweep gas inlets 27 in fluid communication with sweep air source 67; one or more separated fluid inlets 28; and one or more fluid tank fluid outlets 29.

Figure 2:
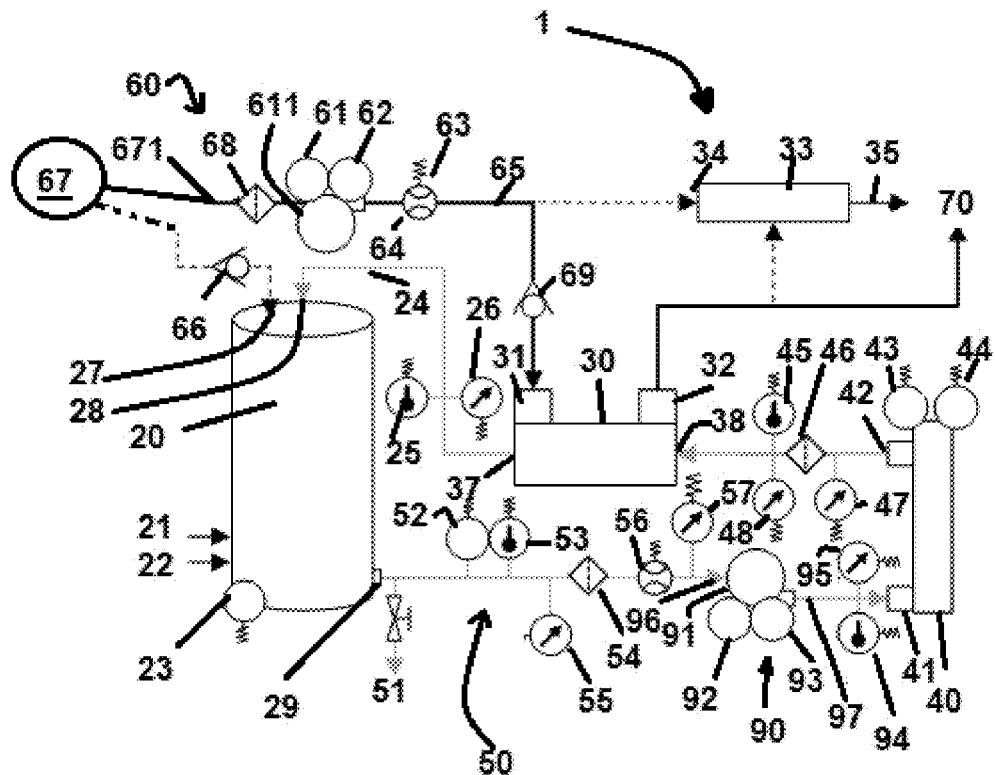
FIG. 2 is a schematic view of a further embodiment of an exemplary electro oxidation membrane evaporator.

Referring additionally to FIG. 2, in embodiments, fluid tank 20 may further comprise thermocouple 25 operatively in communication with separated fluid inlet 28; scale 23 operatively coupled to fluid tank 20; and pressure transducer 26 operatively in communication with separated fluid inlet 28.

Fluid contactor/separator 30 typically comprises one or more first fluid contactor/separator fluid outlets 37 in fluid communication with a corresponding separated fluid inlet 28; one or more separator oxidation cell fluid inlets 38; one or more sweep air source inlets 31 in fluid communication with a corresponding sweep air source fluid outlet 65; one or more second fluid contactor/separator fluid outlets 32; and one or more valves 69 in fluid communication with, and disposed in-between, sweep air source inlet 31 and sweep air handler 60. Fluid contactor/separator 30 may comprise a gas-liquid contactor/separator.

Oxidation cell 40 typically comprises one or more oxidation cell fluid inlets 41 and one or more oxidation cell fluid outlets 42 in fluid communication with oxidation cell fluid inlets 41 and a corresponding separator oxidation cell fluid inlet 38. In embodiments, oxidation cell 40 may further comprise instrumentation such as ammeter 43, voltmeter 44, thermocouple operatively in communication with separator oxidation cell fluid inlet 38, first pressure transducer 47 operatively in communication with the oxidation cell fluid outlet 42, and second pressure transducer 48 operatively in communication with separator oxidation cell fluid inlet 38. In addition, filter 46 may be present and in fluid communication with, and disposed intermediate, oxidation cell fluid outlet 42 and separator oxidation cell fluid inlet 38.

Precipitator 50, which may be a flash precipitator, typically comprises one or more precipitator fluid inlets 96 in fluid communication with a corresponding fluid tank fluid outlet 29 and one or more precipitator fluid outlets 97 in fluid communication with a corresponding oxidation cell fluid inlet 41. Precipitator 50 may further comprise one or more filters 54 in fluid communication with fluid tank fluid outlet 29, where these filters 54 are typically disposed intermediate fluid tank fluid outlet 29 and pump 91.

In embodiments, precipitator 50 further comprises valve 51 in fluid communication with fluid tank fluid outlet 29; pressure transducer 55 operatively connected to fluid tank fluid outlet 29; filter 54 in fluid communication with fluid tank fluid outlet 29 and disposed intermediate fluid tank fluid outlet 29 and pump 91 which may be present and in fluid communication with precipitator fluid inlet 96 and oxidation cell fluid inlet 41; pH probe 52 operatively connected to fluid tank fluid outlet 29; thermocouple 53 operatively connected to fluid tank fluid outlet 29; and flowmeter 56 in fluid communication with fluid tank fluid outlet 29.

In embodiments, sweep air handler 60 typically comprises one or more sweep air source fluid outlets 65 and one or more sweep air sources 67. In embodiments, sweep air handler 60 may further comprise source fluid filter 68 in fluid communication with sweep air source 67; fan 611 in fluid communication with source fluid filter 68; and instrumentation such as ammeter 61 operatively in communication with fan 611, voltmeter 62 operatively in communication with fan 611, and/or flowmeter 63 operatively in communication with fan 611 and with sweep air source inlet 31. In embodiments, sweep air handler 60 comprises air inlet 671, which may be a cabin air inlet, a compressor, an oxygen concentrator or an oxygen bottle and regulator, as sweep air source 67; and fan 611 in fluid communication with air inlet 671.

Figure 1A:
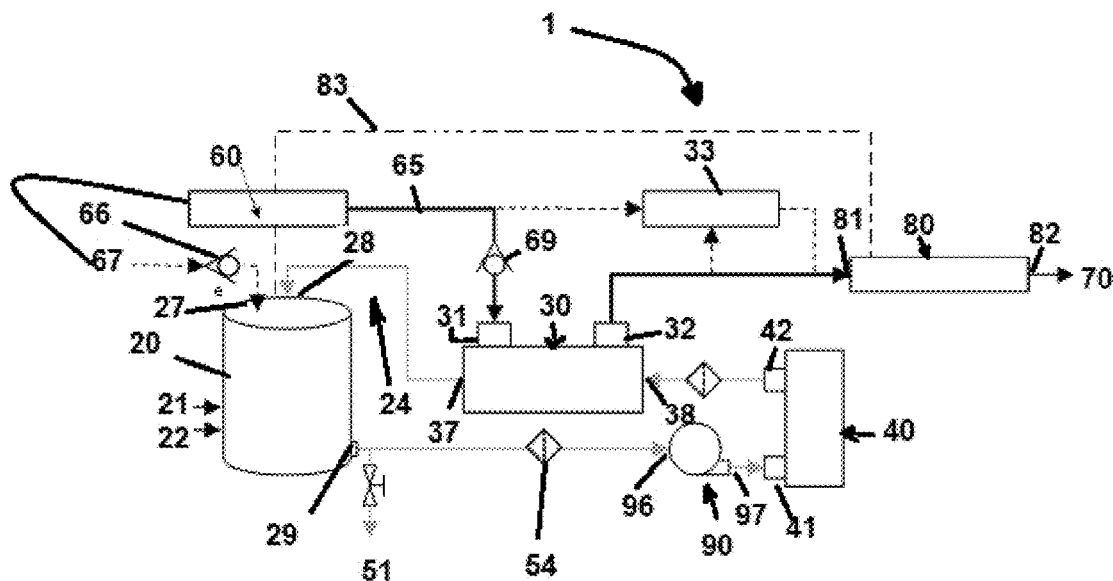
FIG. 1A is a schematic view of a further embodiment of an exemplary electro oxidation membrane evaporator.

Referring back to FIG. 1, scrubber 80 typically comprises one or more scrubber fluid inlets 81 in fluid communication with a corresponding second fluid contactor/separator fluid outlet 32 and one or more scrubber fluid outlets 82. In certain embodiments, fluid line 83 (FIG. 1A) may be present and in fluid communication with fluid tank 20 and scrubber 80.

Figure 3:
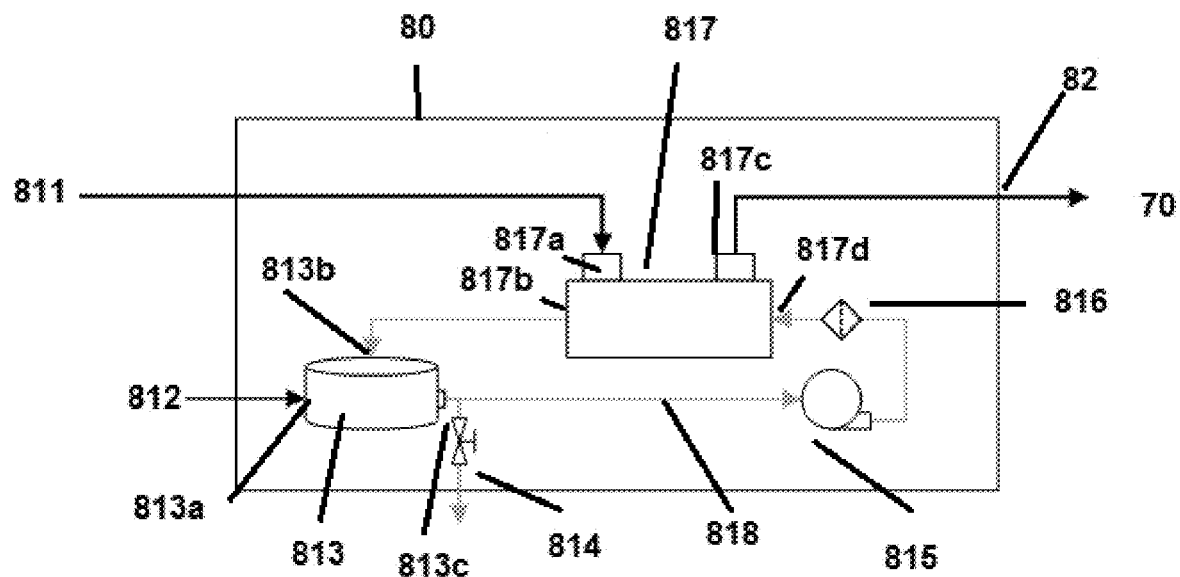
FIG. 3 is a schematic view of an embodiment of a scrubber.

In embodiments, referring now to FIG. 3, scrubber 80 comprises an acid gas scrubber and further comprises acid gas source 811; second contactor/separator 817, comprising acid gas source fluid inlet 817a, separated fluid outlet 817b, base loop fluid inlet 817d, and exhaust outlet 817c; base solution container 813 comprising base fluid inlet 813a in fluid communication with base solution fluid source 812, separated fluid inlet 813b, and base loop fluid outlet 813c; base loop fluid conduit 818 operatively in fluid communication with base loop fluid outlet 813c; chlorinator 814 in fluid communication with the base loop conduit; base loop pump 815 in fluid communication with base loop conduit 818; and filter 816 in fluid communication with base loop pump 815 and with base loop fluid inlet 817d. In embodiments, base solution container 813 comprises sorbent beads that adsorb or absorb gas molecules, e.g. activated carbon, amine beads, molecular sieves, catalytic oxidizer, or the like, or a combination thereof.

Referring back to FIGS. 1 and 1A, in certain embodiments, gas sensor 33 is present and in fluid communication sweep air handler 60, fluid contactor/separator 30, and scrubber 80.

In the operation of exemplary methods, in its embodiments, electro oxidation membrane evaporator 1, as described above, uses fluid contactor/separator 30 whose volume is relatively small for a large surface area in order to expedite evaporation of water from wastewater and to introduce any gas species (including O2) into the wastewater.

Referring back to FIG. 1, wastewater processing and water reclamation may be accomplished using electro oxidation membrane evaporator 1, as described above, by using fluid contactor/separator 30 to provide a wastewater loop with oxygen in order to continuously provide a source of reactive oxygen species (oxidants) for oxidation cell 40 in the waste water processing loop. Oxygen in the wastewater loop is consumed as reactive oxygen species are made and consumed. Additionally, sweep gas is provided from sweep air handler 60 to fluid contactor/separator 30 and oxygen used from a sweep gas transfer across a contactor/separator interface into the wastewater loop due to the resulting partial pressure difference.

By way of example and not limitation, oxidation cell 40 for a 6-person electro oxidation membrane evaporator 1 may comprise one or more Niobium anodes (not shown in the figures), typically just one, functionalized with Boron-Doped Ultra-Nano Crystalline Diamond (BD-UNCD) and a single Tungsten cathode (not shown in the figures). Ultra-nano crystalline diamond adheres to the base material better than larger nano- or micro-crystalline diamonds, thereby providing longer service life. Applied voltage between the electrodes generates current through the electrolyte which is wastewater. The electro-chemical circuit is completed by the mass transfer of charged species in the wastewater and generation of oxidants and gases on the electrodes. On the BD-UNCD anode, the bulk reaction creates oxidants (e.g. hypochlorite, hydroxyl radicals) and gases such as nitrogen ($N_2$). On the cathode side, hydrogen gas ($H_2$) is generated, and nitrate is reduced to nitrite and eventually ammonium that reacts with hypochlorite from the anodes to form $N_2$. The oxidants reduce organic compounds and micro-organisms in urine. The resulting byproduct gases (e.g. $CO_2$, $N_2$, chlorine, water vapor, $H_2$, and the like) will exit the wastewater loop through fluid contactor/separator 30 and be carried to scrubber 80 by sweep gas. Trace contaminant gases may be selectively scrubbed by scrubber 80, which may be referred to as a regenerable scrubber, while reusable gases such as $CO_2$ and water vapor will be released, e.g. to a cabin, and may be collected elsewhere for reuse. This chemical reduction of wastewater waste products to useable gases may allow greater loop closure than previously achieved by current habitat and vehicle wastewater processing systems.

In a traditional electro-oxidation system, the precursors necessary to generate oxidants (salt and $O_2$) are limited in the wastewater and may or may not be enough to complete the oxidation process without replenishment. Lack of oxidants is also known to cause the wastewater pH to remain high. However, fluid contactor/separator 30 allows $O_2$ from cabin air to diffuse into the wastewater via partial pressure differential, thereby continuously replenishing the $O_2$ that gets used to generate reactive oxygen species (ROS) such as hydrogen peroxide, thus making the pH low at the end of the process. The low pH also discourages precipitates from forming and allows longer and more complete wastewater processing to recover more water and useful gases. The acidic brine product at the end of each process may be used as pretreat in the following process. This self-generated pre-treat could eliminate the need for launching, storing and handling an acid/chromium trioxide pretreat consumable.

The process also generates heat that increases the wastewater temperature and the water evaporation rate from fluid contactor/separator 30 into the sweep gas flow (fan or fluid controller powered air). Fluid contactor/separator 30 may comprise PTFE nano-porous hydrophobic hollow fiber membranes that are compatible with acidic and oxidizing environments and is resistant to microbial growth.

In embodiments, the sweep gas comprises a gas comprising around 21% oxygen, a gas comprising a higher concentration of oxygen than that of normal air, or a gas comprising around 100% oxygen. If the sweep gas comprises a higher concentration of oxygen than that of normal air, such sweep gas may be obtained by using a pressure swing adsorber (PSA) to scrub nitrogen from ambient air. In an alternate embodiment, sweep gas comprising around 100% oxygen may be obtained from an oxygen fluid container. Use of a faster sweep gas, e.g. via sweep gas fan 911 which may be either a fan or other flow controller, may aid in changing a mixture ration and/or diluting partial pressure and expediting evaporation from the wastewater loop.

In addition, wastewater pH and precipitate may be controlled by using a base (alkaline) gas or acid gas as the sweep gas in order to control partial pressure difference in fluid contactor/separator 30 and controlling an exchange rate of particular gas or gasses. Additionally, sweep gas fan 611 may be controlled to change partial pressure of gas species in fluid contactor/separator 30.

One or more check valves 66 may be disposed in a sweep gas fluid stream upstream of fluid contactor/separator 30 and/or upstream of fluid tank 20 to prevent reverse gas flow may be used to prevent reverse gas flow.

Figure 4:
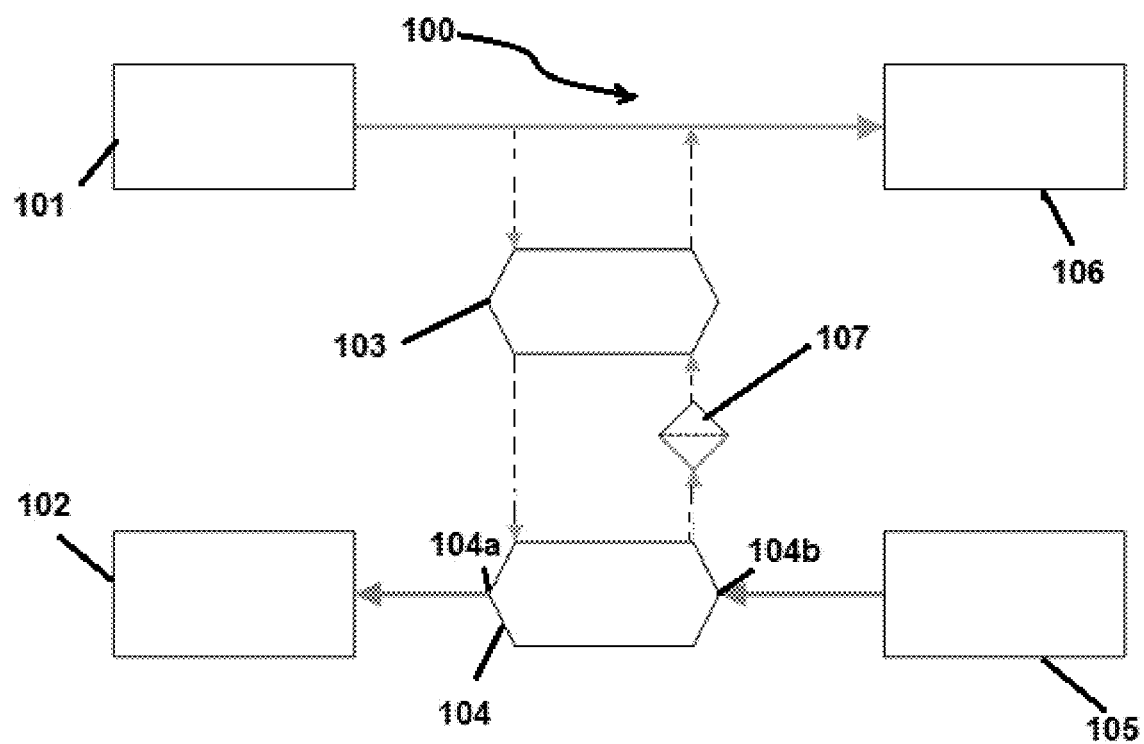
FIG. 4 is a schematic view of an embodiment of an exemplary recuperator.
Figure 5:
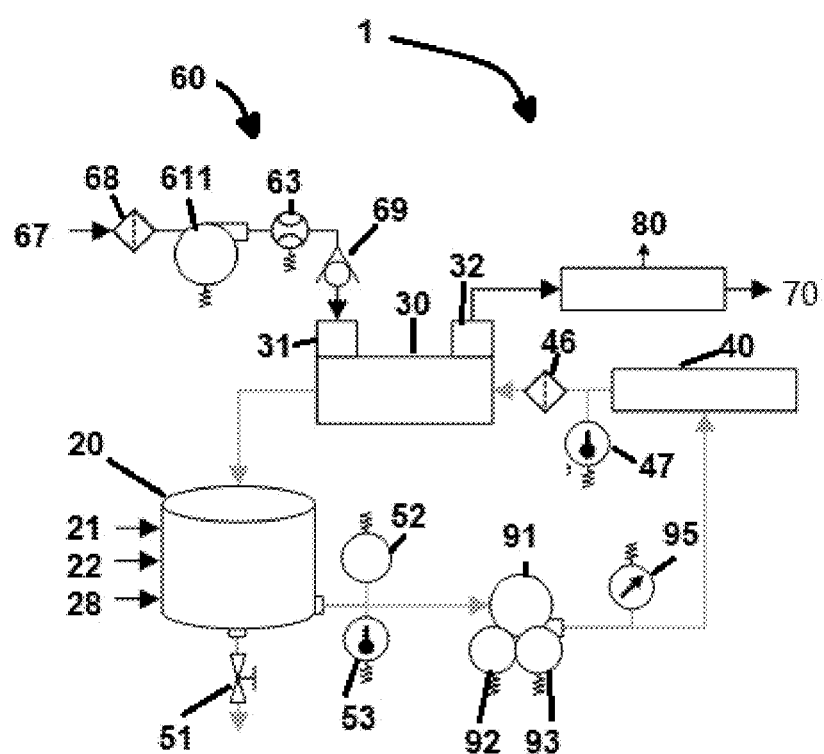
FIG. 5 is a schematic view of a further embodiment of an exemplary electro oxidation membrane evaporator.

In embodiments where precipitator 50 comprises a flash precipitator, referring additionally to FIG. 4, electro oxidation membrane evaporator 1 may further comprise recuperator 100 comprising recuperator heat exchanger 103 in fluid communication with the wastewater loop; primary heat exchanger 104 in fluid communication with recupterator heat exchanger 103; and filter 107 in fluid communication with recuperator heat exchange 103 and primary heat exchanger 104. In these embodiments, precipitate may be forced by temperature control by diverting a portion of the fluid flowing in the wastewater loop to recuperator heat exchanger 103 such as via port 101; actively controlling a temperature of the diverted portion of the wastewater, e.g. lowering that temperature or elevating that temperature, to force precipitates to occur in a specific spot in the liquid loop; and routing the diverted portion of the wastewater with the lowered temperature back to the wastewater loop.

Primary heat exchanger 104 may be used to control the wastewater temperature and filter 107 disposed downstream of primary heat exchanger 104 such that fluid flows from primary heat exchanger 104 back to recuperator heat exchanger 103. Filter 107 may also be used to catch precipitate in the diverted portion of the wastewater. In this embodiment as well, recuperator heat exchanger 103 may be used to recuperate energy put into cooling the flow to reduce energy consumption and increase the temperature of the returning partial flow so that further precipitate would not occur before going back to the main wastewater loop.

Primary heat exchanger 104 may further comprise cold loop fluid inlet 104b at cold loop source 105 that is not in fluid communication with the diverted portion of the wastewater and cold loop fluid outlet 104a in fluid communication with cold loop fluid inlet 104b and cold loop exit 102.

In embodiments where electro oxidation membrane evaporator 1 comprises acid gas scrubber (FIG. 4), a base solution may flow into container 813 and then out from container 813 into base loop conduit 818 where it can be mixed in base loop conduit 818 with a chlorinated fluid from chlorinator 814 and provided to second fluid contactor/separator 817. A base liquid loop formed this way may be used to scrub acid gas using second fluid contactor/separator 817.

An acidic sweep gas may be supplied from acid gas source 811 to second fluid contactor/separator 817 and passed from an oxidation process through second contactor/separator 817. The acidic sweep gas may be dissolved from into second contactor/separator 817 into a base solution loop.

As will be apparent to those of ordinary skill in the water reclamation arts, electro oxidation membrane evaporator 1 purifies wastewater and can reduce odors by breaking down organic compounds with powerful oxidants such as reactive oxygen species (ROS) and chlorine containing species (CCS) created from oxygen ($O_2$) and chloride salts in the wastewater on Boron-Doped-Diamond (BDD) coated electrodes.

As described above, waste heat generated from the electro-oxidation process may be used to facilitate water evaporation through fluid contactor/separator 30, allowing water evaporated from the wastewater to be recovered elsewhere. The resulting brine may be offloaded to a brine water recovery system to recover the remaining water, e.g. via valve 51. Electro oxidation membrane evaporator 1 may allow higher percent water recovery from wastewater prior to delivering brine to a brine water recovery system. As described above, electro oxidation membrane evaporator 1 allows $O_2$ from air such as cabin air to continuously diffuse into the wastewater as $O_2$ is consumed to generate oxidants, helping to eliminate the low oxidant environment at the end of the cycle that causes pH to remain high, and low pH prevents precipitates from forming for longer so more water can be evaporated from the wastewater. In addition, the acidic brine product at the end of each process may be useable as a pretreatment for urine and may replace an acid/chromium trioxide pretreat consumable, and result in reduced launch mass, crew time, and safety hazards. The described oxidation processes may also allow further closing of the environmental loop, i.e. it may break down previously unusable wastewater components into more basic gas species (e.g., $CO_2$, $H_2O$) that can be recycled rather than disposed of with the brine sludge after brine water recovery.

The foregoing disclosure and description of the inventions are illustrative and explanatory. Various changes in the size, shape, and materials, as well as in the details of the illustrative construction and/or an illustrative method may be made without departing from the spirit of the invention.

We claim:

1. An evaporator, comprising:
   a) a sweep air handler comprising:
      i) a sweep air source fluid outlet; and
      ii) a sweep air source;
   b) a fluid tank defining a fluid container, the fluid tank comprising:
      i) a waste fluid inlet;
      ii) an intake fluid inlet;
      iii) a sweep gas inlet in fluid communication with the sweep air source;
      iv) a separated fluid inlet; and
      v) a fluid tank fluid outlet;
   c) a fluid contactor/separator, comprising:
      i) a first fluid contactor/separator fluid outlet in fluid communication with the separated fluid inlet;
      ii) a separator oxidation cell fluid inlet;
      iii) a sweep air source inlet in fluid communication with the sweep air source fluid outlet;
      iv) a second fluid contactor/separator fluid outlet; and
      v) a valve in fluid communication with the sweep air source inlet and the sweep air handler;
   d) an oxidation cell comprising:
      i) an oxidation cell fluid inlet; and
      ii) an oxidation cell fluid outlet in fluid communication with the oxidation cell fluid inlet and the separator oxidation cell fluid inlet;
   e) a precipitator, comprising:
      i) a precipitator fluid inlet in fluid communication with the fluid tank fluid outlet; and
      ii) a precipitator fluid outlet in fluid communication with the oxidation cell fluid inlet; and
   f) a scrubber, comprising:
      i) a scrubber fluid inlet in fluid communication with the second fluid contactor/separator fluid outlet; and
      ii) a scrubber fluid outlet.

2. The evaporator of claim 1, further comprising a gas sensor in fluid communication with the sweep air handler, the fluid contactor/separator, and the scrubber.

3. The evaporator of claim 1, further comprising a fluid line in fluid communication with the fluid tank and the scrubber.

4. The evaporator of claim 1, further comprising a pump in fluid communication with the precipitator fluid inlet and the oxidation cell fluid inlet.

5. The evaporator of claim 4, wherein the precipitator comprises a filter in fluid communication with the fluid tank fluid outlet, the filter disposed intermediate the fluid tank fluid outlet and the pump.

6. The evaporator of claim 1, wherein the fluid tank further comprises:
   a) a thermocouple operatively in communication with the separated fluid inlet;
   b) a scale operatively coupled to the fluid tank; and
   c) a pressure transducer operatively in communication with the separated fluid inlet.

7. The evaporator of claim 1, wherein the oxidation cell further comprises:
   a) an ammeter;
   b) a voltmeter;
   c) a filter in fluid communication with, and disposed intermediate, the oxidation cell fluid outlet and the separator oxidation cell fluid inlet;
   d) a thermocouple operatively in communication with the separator oxidation cell fluid inlet;
   e) a first pressure transducer operatively in communication with the oxidation cell fluid outlet; and
   f) a second pressure transducer operatively in communication with the separator oxidation cell fluid inlet.

8. The evaporator of claim 1, wherein the precipitator further comprises:
   a) a valve in fluid communication with the fluid tank fluid outlet;
   b) a pressure transducer operatively connected to the fluid tank fluid outlet;
   c) a filter in fluid communication with the fluid tank fluid outlet and disposed intermediate the fluid tank fluid outlet and the pump;
   d) a pH probe operatively connected to the fluid tank fluid outlet;
   e) a thermocouple operatively connected to the fluid tank fluid outlet; and
   f) a flowmeter in fluid communication with the fluid tank fluid outlet.

9. The evaporator of claim 1, wherein the sweep air handler further comprises:
   a) a source fluid filter in fluid communication with the sweep air source;
   b) a fan in fluid communication with the source fluid filter;
   c) an ammeter operatively in communication with the fan;
   d) a voltmeter operatively in communication with the fan; and
   e) a flowmeter operatively in communication with the fan and with the sweep air source inlet.

10. The evaporator of claim 1, wherein the sweep air handler comprises:
    a) a cabin air inlet;
    b) a fan in fluid communication with the cabin air inlet;
    c) a cabin air inlet, compressor, and oxygen concentrator; or
    d) an oxygen bottle and regulator.

11. The evaporator of claim 1, wherein the scrubber comprises an acid gas scrubber, further comprising:
    a) an acid gas source;
    b) a second contactor/separator, comprising:
       i) an acid gas source fluid inlet;
       ii) a separated fluid outlet;
       iii) a base loop fluid inlet; and
       iv) an exhaust outlet;
    c) a base solution container comprising:
       i) a base fluid inlet in fluid communication with a base solution fluid source;
       ii) a separated fluid inlet; and
       iii) a base loop fluid outlet;
    d) a base loop fluid conduit operatively in fluid communication with the base loop fluid outlet;
    e) a chlorinator in fluid communication with the base loop conduit;
    f) a base loop pump in fluid communication with the base loop conduit; and
    g) a filter in fluid communication with the base loop pump and with the base loop fluid inlet.

12. A method of wastewater processing and water reclamation using an evaporator which comprises a sweep air handler comprising a sweep air source fluid outlet and a sweep air source; a fluid tank defining a fluid container where the fluid tank comprises a waste fluid inlet, an intake fluid inlet, a sweep gas inlet in fluid communication with the sweep air source, a separated fluid inlet, and a fluid tank fluid outlet; a fluid contactor/separator which comprises a first fluid contactor/separator fluid outlet in fluid communication with the separated fluid inlet, a separator oxidation cell fluid inlet, a sweep air source inlet in fluid communication with the sweep air source fluid outlet, a second fluid contactor/separator fluid outlet, and a valve in fluid communication with the sweep air source inlet and the sweep air handler; an oxidation cell which comprises an oxidation cell fluid inlet and an oxidation cell fluid outlet in fluid communication with the oxidation cell fluid inlet and the separator oxidation cell fluid inlet; a precipitator which comprises a precipitator fluid inlet in fluid communication with the fluid tank fluid outlet and a precipitator fluid outlet in fluid communication with the oxidation cell fluid inlet; and a scrubber which comprises a scrubber fluid inlet in fluid communication with the second fluid contactor/separator fluid outlet and a scrubber fluid outlet, the method comprising:
    a) using the fluid contactor/separator to provide a wastewater processing loop with oxygen in order to continuously provide a source of reactive oxygen species operative as an oxidant for the oxidation cell in the wastewater processing loop;
    b) consuming the oxygen in the wastewater processing loop as reactive oxygen species are made and consumed;
    c) providing a sweep gas from the sweep air source to the fluid contactor/separator; and
    d) using oxygen from a sweep gas transfer across a contactor/separator interface into the wastewater processing loop due to the resulting partial pressure difference.

13. The method of wastewater processing and water reclamation using the system of claim 12, wherein the sweep air source comprises a gas comprising around 21% oxygen, a gas comprising a higher concentration of oxygen than that of sea level atmospheric air, or a gas comprising around 100% oxygen.

14. The method of wastewater processing and water reclamation of claim 13, wherein the gas comprising a higher concentration of oxygen than that of sea level atmospheric air is obtained by using a pressure swing adsorber (PSA) to scrub nitrogen from ambient air.

15. The method of wastewater processing and water reclamation of claim 14 wherein the system comprises the acid gas scrubber, the system further comprising an acid gas source; a second fluid contactor/separator comprising acid gas a source fluid inlet, a separated fluid outlet, a base loop fluid inlet, and an exhaust outlet; a base solution container comprising a base fluid inlet in fluid communication with a base solution fluid source, a separated fluid inlet, and a base loop fluid outlet; a base loop fluid conduit operatively in fluid communication with the base loop fluid outlet; a chlorinator in fluid communication with the base loop conduit; a base loop pump in fluid communication with the base loop conduit; and a filter in fluid communication with the base loop pump and with a base loop fluid inlet, the method further comprising:
  a) flowing a base solution into the container and then out from the container into the base loop conduit;
  b) mixing the base solution in the base loop conduit with a chlorinated fluid from the chlorinator;
  c) providing the chlorinated base loop fluid to the second fluid contactor/separator;
  d) supplying an acidic sweep gas from the acid gas source to the second fluid contactor/separator;
  e) passing the acidic sweep gas from the oxidation process through the second fluid contactor/separator; and
  f) dissolving the acidic sweep gas from the gas-liquid contactor/separator into a base solution loop.

16. The method of wastewater processing and water reclamation of claim 13, wherein the gas comprising around 100% oxygen is obtained from an oxygen fluid container.

17. The method of wastewater processing and water reclamation of claim 12, wherein providing a sweep gas further comprises providing a sweep gas comprising a base (alkaline) gas or acid gas in order to control partial pressure difference in the fluid contactor/separator and control exchange rate of particular gas(es), further comprising:
  a) controlling wastewater pH and precipitate; and
  c) controlling a sweep gas fan to change either a mixture ratio or partial pressure of gas species in the evaporator.

18. The method of wastewater processing and water reclamation of claim 12, further comprising using a check valve in a sweep gas fluid stream upstream of the fluid contactor/separator, upstream of the fluid tank, or upstream of both the fluid contactor/separator and the fluid tank to prevent reverse gas flow.

19. The method of wastewater processing and water reclamation of claim 12, wherein the precipitator further comprises a flash precipitator and the system further comprises a recuperator heat exchanger in fluid communication with the wastewater processing loop, a primary heat exchanger in fluid communication with the recuperator heat exchanger, and a filter in fluid communication with the recuperator heat exchange and the primary heat exchanger, the method further comprising forcing precipitate by temperature control by:
  i) diverting a portion of the fluid flowing in the wastewater processing loop to the recuperator heat exchanger;
  ii) actively controlling a temperature of the diverted portion of the wastewater to force precipitates to occur in a specific spot in the wastewater processing loop; and
  iii) routing the diverted portion of the wastewater with the lowered temperature back to the wastewater loop.

20. The method of wastewater processing and water reclamation of claim 19, further comprising:
  a) using the primary heat exchanger to control wastewater temperature;
  b) disposing the filter downstream of the primary heat exchanger such that fluid flows from the primary heat exchanger back to the recuperator heat exchanger; and
  c) using the filter to catch precipitate in the diverted portion of the wastewater.

21. The method of wastewater processing and water reclamation of claim 19, further comprising using the recuperator heat exchanger to recuperate energy put into cooling flowing liquid in the recuperator heat exchanger to reduce energy consumption and increase the temperature of a returning partial flow of liquid in the recuperator heat exchanger so that further precipitate would not occur before going back to the main wastewater processing loop.

22. The method of wastewater processing and water reclamation of claim 19, wherein the primary heat exchanger further comprises:
  a) a cold loop fluid inlet that is not in fluid communication with the diverted portion of the wastewater; and
  b) a cold loop fluid outlet in fluid communication with the cold loop fluid inlet.

* * * * *